US007246443B2

(12) United States Patent
Stravitz

(10) Patent No.: US 7,246,443 B2
(45) Date of Patent: Jul. 24, 2007

(54) CUTTING DEVICE FOR MAKING INTERIOR CUTS

(76) Inventor: David M. Stravitz, 16 Park Ave. - Suite 14A, New York, NY (US) 10016

( * ) Notice: Subject to any disclaimer, the term of this patent is extended or adjusted under 35 U.S.C. 154(b) by 394 days.

(21) Appl. No.: 10/935,340

(22) Filed: Sep. 7, 2004

(65) Prior Publication Data

US 2006/0048393 A1 Mar. 9, 2006

(51) Int. Cl.
*B23D 21/08* (2006.01)

(52) U.S. Cl. ............................ 30/240; 30/102; 30/265

(58) Field of Classification Search .................... 30/94, 30/101, 102, 265, 321, 263, 240
See application file for complete search history.

(56) References Cited

U.S. PATENT DOCUMENTS

| | | | | |
|---|---|---|---|---|
| 9,158 | A | 7/1852 | Malcott | |
| 164,327 | A | 6/1875 | Pleas | |
| 226,358 | A | 4/1880 | Schaffer | |
| 247,766 | A | 10/1881 | Korn | |
| 301,305 | A | 7/1884 | Theis | |
| 316,151 | A | 4/1885 | Kamak | |
| 328,813 | A | 10/1885 | Roder | |
| 356,253 | A | 1/1887 | Lant | |
| 384,653 | A | 6/1888 | Vrooman | |
| 397,438 | A | 2/1889 | Nowill | |
| 414,528 | A | 11/1889 | Halbehann | |
| 427,639 | A | 5/1890 | Theis | |
| 492,452 | A | 2/1893 | Wright | |
| 561,775 | A | 6/1896 | Eisenbart | |
| 581,615 | A | 4/1897 | Redifer | |
| 630,455 | A | 8/1899 | Hazard | |
| 879,618 | A | 2/1908 | Flyberg | |
| 1,031,578 | A * | 7/1912 | Palis | 30/265 |
| 1,034,947 | A | 8/1912 | Alvord et al. | |
| 1,062,829 | A | 5/1913 | Karsitz | |
| 1,077,280 | A | 11/1913 | Karsitz | |
| 1,080,145 | A | 12/1913 | Friederick | |
| 1,124,025 | A | 1/1915 | Johnson | |
| 1,187,142 | A | 6/1916 | Gronroos | |
| 1,205,999 | A | 11/1916 | Kirmsee | |
| 1,256,916 | A | 2/1918 | MacLean | |
| 1,488,832 | A | 4/1924 | Rauth | |
| 2,174,222 | A | 9/1939 | Florian | |
| 2,285,249 | A | 6/1942 | Barentzen | |

(Continued)

FOREIGN PATENT DOCUMENTS

| | | |
|---|---|---|
| JP | 10-57640 A | 3/1998 |

(Continued)

*Primary Examiner*—Kenneth E. Peterson
*Assistant Examiner*—Sean Michalski
(74) *Attorney, Agent, or Firm*—Frishauf, Holtz, Goodman & Chick, P.C.

(57) ABSTRACT

Cutting device for making interior cuts includes first and second pivot members pivotally connected to one another at a pivot point and each including a handle portion with a finger-receiving aperture on one side of the pivot point and an arm portion on the other side of the pivot point. One or more rotatable, substantially circular cutting blades are arranged at a free end part of the arm portion of the first pivot member while one or more support rolls are arranged at a free end part of the arm portion of the second pivot member in a position opposite at least one of the cutting blade(s).

24 Claims, 6 Drawing Sheets

U.S. PATENT DOCUMENTS 2,437,971 A 3/1948 Russell
2,527,082 A 10/1950 Salas
2,578,346 A 12/1951 Florian et al.
2,708,311 A 5/1955 McCloud
3,522,617 A * 8/1970 Kowal ......................... 30/102
D225,608 S 12/1972 Schwartz et al.
3,815,230 A 6/1974 Florian
3,815,231 A 6/1974 Greenberg
5,499,454 A * 3/1996 Compton ..................... 30/120
5,581,886 A * 12/1996 Sesser et al. ................. 30/101
6,237,449 B1 5/2001 Orlosky

FOREIGN PATENT DOCUMENTS

JP 2003-304744 A 10/2003

* cited by examiner

FIG.1
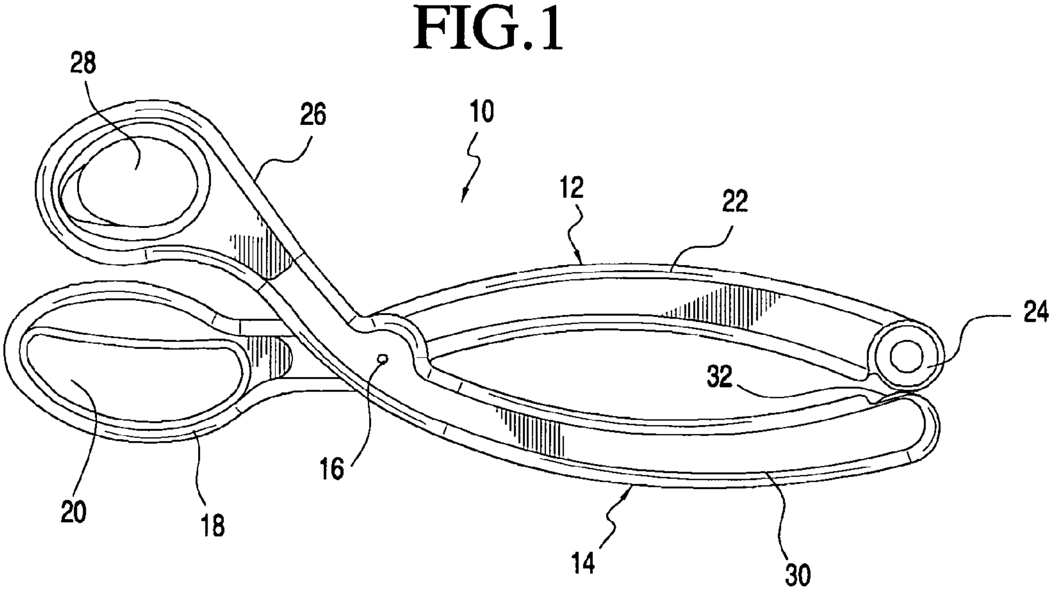
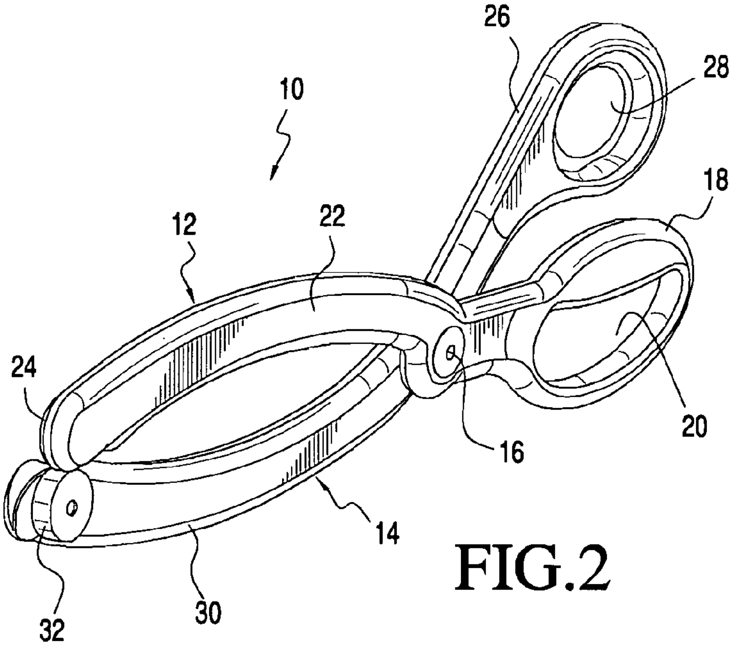
FIG.2

CUTTING DEVICE FOR MAKING INTERIOR CUTS

FIELD OF THE INVENTION

The present invention relates to a cutting device for making interior cuts in a sheet material, i.e., cuts which do not extend to or from an edge of the sheet material.

BACKGROUND OF THE INVENTION

Often, it is desired to make interior cuts in sheet material, e.g., for the purpose of forming a mat or border for a picture or picture frame. Since the cuts do not extend to any edge of the sheet, it is problematic to make such cuts using conventional scissors. A similar problem arises when forming button holes in fabric. Special cutting devices are therefore advantageously used to form interior cuts such as button holes.

One prior art mechanism for making button holes is described in U.S. Pat. No. 9,158. The cutting mechanism includes a pair of levers or blades which are pressed toward one another, with fabric therebetween, so as to form a button hole in the fabric. Other button hole-forming cutting devices are described in U.S. Pat. Nos. 226,358, 247,766, 301,305, 316,151, 328,813, 356,253, 384,653, 397,438, 414,528, 427,639, 492,452, 561,775, 581,615, 630,455, 879,618, 1,034,947, 1,062,829, 1,077,280, 1,080,145, 1,124,025, 1,187,142, 1,205,999, 1,256,916, 2,708,311 and 5,499,454, and Japanese Patent No. 10-57640.

Other mechanisms for cutting sheet material are described in U.S. Pat. Nos. Des. 225,608, 164,327, 1,031,587, 1,488,832, 2,174,222, 2,285,249, 2,527,062, 2,578,346, 3,815,230 and 3,815,231. Generally, these cutting mechanism cannot be used to make interior cuts.

OBJECTS AND SUMMARY OF THE INVENTION

It is an object of the present invention to provide a new and improved cutting device for making interior cuts in a sheet material, i.e., cuts which do not extend to or from an edge of the sheet material.

It is another object of the present invention to provide a new and improved cutting device which makes interior cuts in sheet material by pulling the cutting device along the sheet material in a direction toward the user, as opposed to pushing the cutting in a direction away from the user as is necessary for prior art cutting devices.

In order to achieve these objects and others, a cutting device for making interior cuts in accordance with the invention includes first and second pivot members pivotally connected to one another at a pivot point and each including a handle portion with a finger-receiving aperture on one side of the pivot point and an arm portion on the other side of the pivot point. One or more rotatable, substantially circular cutting blades are arranged at a free end part of the arm portion of the first pivot member while one or more support rolls are arranged at a free end part of the arm portion of the second pivot member in a position opposite at least one of the cutting blade(s). The support roll(s) may also be rotatable.

A user can make an interior cut by positioning the cutting blade above the interior location on the sheet material at which the cut will begin, squeezing the handle portions together to cause the cutting blade to press the sheet material against the support roll and then pull (or push) the cutting device while maintaining pressure on the handle portions. When the cut is finished, the user releases the pressure on the handle portions.

To enable the cutting blade to be positioned at an interior location of the sheet material, the arm portions are spaced apart from one another by a gap. In use, a portion of the sheet material including an edge thereof is present in this gap. The cutting device is therefore able to reach over this portion of the sheet material without cutting it. The arm portions may be arcuate and curved in opposite directions of curvature to thereby form the gap therebetween.

To add versatility to the cutting device, the arm portions can have an adjustable length, e.g., by constructing them with a telescoping member which is movable relative to a frame portion connected to the handle portion. The cutting blade(s) and support roll(s) are arranged on a respective one of the telescoping members. A positioning mechanism is preferably provided to fix the telescoping members in position relative to the frame portions to enable effective use of the cutting device. A locking mechanism can also be provided to lock the pivot members when the telescoping members are in a retracted position.

Another embodiment of a cutting device for making interior cuts in a sheet material includes first and second elongated members pivotally connected together at a pivot point between opposite ends thereof, at least one freely rotatable cutting blade arranged at a free end portion of the first member on a first side of the pivot point, at least one support roll arranged at a free end portion of the second member on a first side of the pivot point and in a position opposite at least one of the cutting blade(s) and finger-gripping portions arranged on a second side of the pivot point on each of the members. The same features described above can also be present in this embodiment.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 1 is a front elevational view of a first embodiment of a cutting device in accordance with the invention in a storage or non-use position.

FIG. 2 is a rear perspective view of the cutting device shown in FIG. 1 in the storage position.

DETAILED DESCRIPTION OF THE INVENTION

Figure 3:
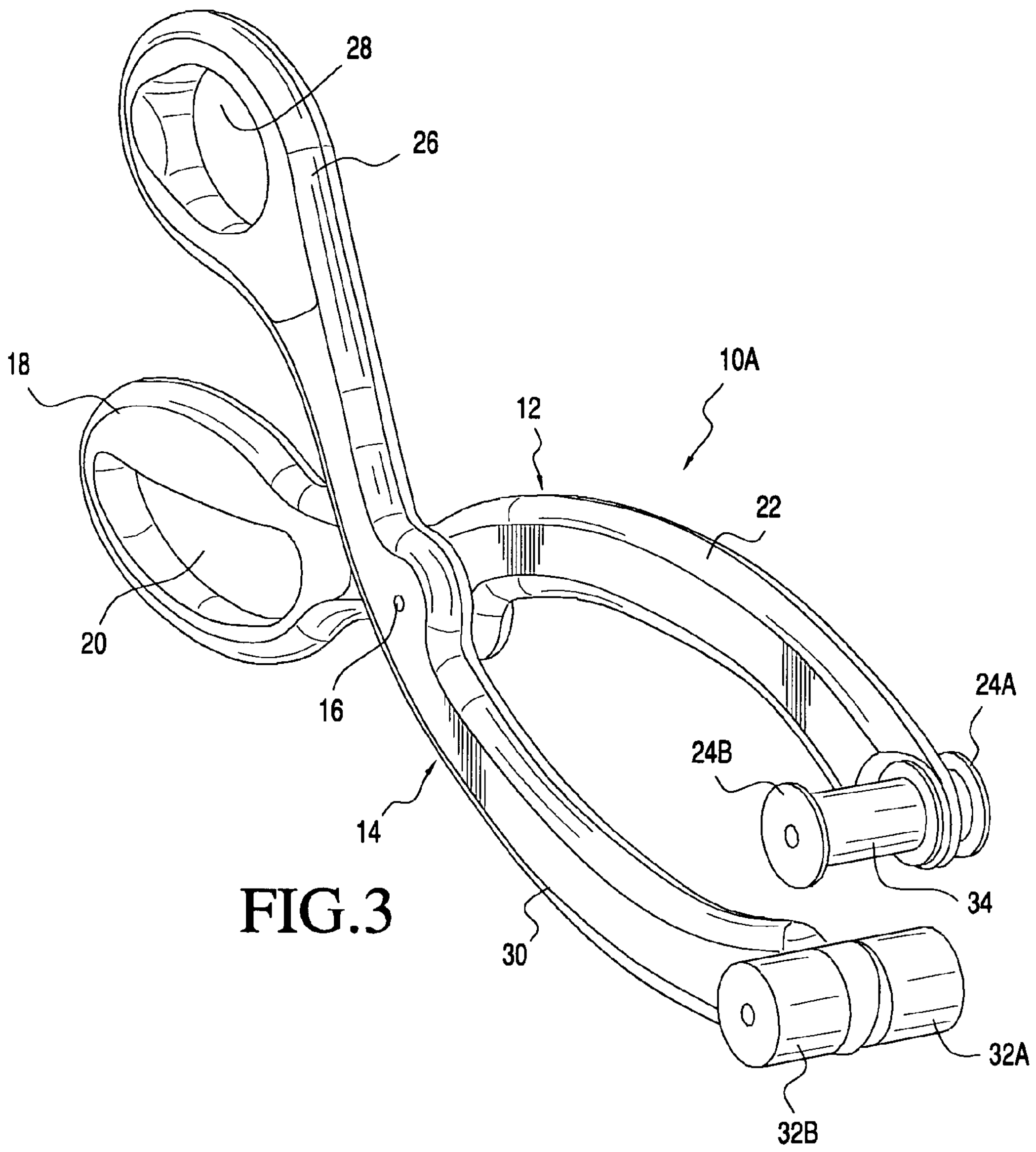
FIG. 3 is a front perspective view of a second embodiment of a cutting device in accordance with the invention.
Figure 4:
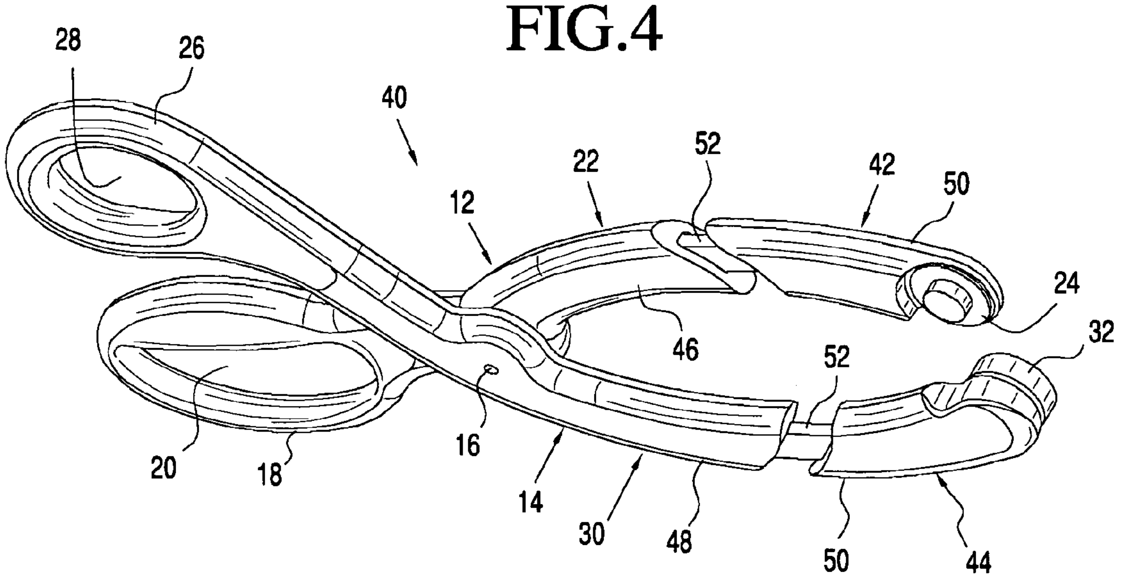
FIG. 4 is a front perspective view of a third embodiment of a cutting device in accordance with the invention in a position ready for use.

Referring to the accompanying drawings wherein like reference numbers refer to the same or similar elements, a first embodiment of a cutting device in accordance with the invention is shown in FIGS. 1 and 2 and is designated generally as 10. Cutting device 10 includes first and second pivot members 12, 14 pivotally connected to one another at a pivot point 16.

First pivot member 12 includes a finger-gripping or handle portion 18 with a finger-receiving aperture 20 on one side of the pivot point 16 and an arcuate arm portion 22 on the other side of the pivot point 16. A freely rotatable, circular cutting blade 24 is arranged at a free, forward end part of the arm portion 22 such that only a portion of its cutting edge facing the pivot member 14 is exposed. The remaining part of the cutting edge is preferably recessed to prevent bodily injury caused by inadvertent contact with the cutting blade 24.

Cutting blade 24 may be a flat, smooth blade with a sharp cutting edge. Alternatively, a cutting blade with wavy edges or a serration-forming cutting edge may be provided to enable the formation of wavy or otherwise irregular interior cuts.

Second pivot member 14 includes a finger-gripping or handle portion 26 with a finger-receiving aperture 28 on one side of the pivot point 16 and an arcuate arm portion 30 on the other side of the pivot point 16. A cylindrical back-up or support roll 32 is arranged at a free, forward end part of the arm portion 30 in a position opposite the cutting blade 24. Support roll 32 can have a flat outer cylindrical surface and may be made of plastic, nylon and other similar materials. Preferably, support roll 32 is rotatably mounted to the arm portion 30.

When the handle portions 18, 26 are squeezed or urged toward one another, the cutting blade 24 contacts the support roll 32 as shown in FIGS. 1 and 2. This may be considered a storage or non-use position.

Pivot point 16 may be defined by a pivot pin fixed to or integral with one of the pivot members 12, 14 and rotatable relative to the other pivot member 12, 14. Other pivot mechanisms for pivotally connecting the pivot members 12, 14 together are also within the scope and spirit of the invention, and several are known to those skilled in the art. As shown, the pivot point 16 is closer to the end of the handle portions 18, 26, i.e., the handle portions 18, 26 are shorter than the arm portions 22, 30.

The arm portions 22, 30 are designed to situate the cutting blade 24 and support roll 32 at a distance from the pivot point 16 without overlapping one another. In this manner, a gap is formed between the arm portions 22, 30 and allows the cutting blade 24 to extend to an interior location on sheet material without contacting the sheet material. This gap may be formed by constructing the arm portions 22, 30 of the pivot members 12, 14 with opposite directions of curvature, i.e., one is convex and the other is concave, such that the gap is substantially oval.

The dimensions of the arm portions 22, 30 may be varied as desired to provide the cutting device 10 with either a relatively short reach, an average reach or a relatively long reach, the reach being the distance between the pivot point 16 and the contact point between the cutting blade 24 and the support roll 32. The variations in the reach may be achieved by varying the radius of curvature of the arm portions 22, 30, when arcuate, as well as the length of arm portion 22, 30. The reach may be anywhere from 2 inches to 12 inches or even more (including all ranges in between), depending on the maximum length of the interior cut to be made by the cutting device.

As shown, the aperture 28 on the pivot member 14 is designed to receive the thumb of the user while aperture 20 on pivot member 12 is elongated and designed to receive one or more of the user's remaining fingers. Alternatively, a thumb-receiving aperture can be provided on pivot member 12 and an elongated aperture can be provided on pivot member 14.

In use to make an interior cut in a sheet material, when the cutting device 10 is opened and manipulated such that pivot member 12 is above the sheet material to be cut, such as paper or fabric, and pivot member 14 is below the sheet material (or vice versa), when the handle portions 18, 26 are squeezed or urged toward one another, the cutting blade 24 is pressed the sheet material against the support roll 32 with the sheet material being interposed between the cutting blade 24 and the support roll 32. When the cutting device 10 is pulled (or pushed) along the sheet material, the sheet material is cut in a line as the cutting blade 24 rotates opposite the support roll 32. The support roll 32 also rotates along the lower surface of the sheet material. The user pulls the cutting device by drawing his or her fingers inserted through the apertures 18, 28 toward the user's body. Use of the cutting device thus differs from prior art cutting devices wherein the user must push the cutting device in order to cut sheet material.

An interior cut may thus be formed in the sheet material by positioning the cutting blade 24 at an interior location which will be the start of the cut, pulling the cutting device 10 along the sheet material toward the user and then separating the cutting blade 24 from the sheet material at the end of the cut.

One advantage of the cutting device 10 is its ability to cut different shapes of lines, e.g., a straight line, a curved line and combinations thereof. Since essentially only a point contact is formed between the cutting blade 24 and the sheet material, the user can turn the cutting device 10 at any location during the cutting operation to change the direction of the cut. Curved interior cuts can thus easily be made.

Modifications to the cutting device 10 described above are envisioned. For example, the pivot member 12 may include a blade guard to cover a portion of the cutting blade 24 and thereby prevent injuries. Also, the cutting blade 24 may be removably connected to the arm portion 12 of the pivot member 12, e.g., via a screw and washer-type connection to enable replacement of the cutting blade 24 when it becomes worn.

Also, as shown in FIG. 3, a second embodiment of a cutting device 10A includes two cutting blades 24A, 24B arranged at the free forward end part of the arm portion 22, one on each side thereof. Cutting blades 24A, 24B can be mounted to a common cutting shaft 34. Two support rolls 32A, 32B are arranged on the arm portion 30, one on each side thereof, and in a position opposite a respective cutting blade 24A, 24B. Alternatively, a single support roll can be provided with an axial length sufficient to be opposite both the cutting blades. With cutting device 10A, a pair of parallel interior cuts can be formed in sheet material.

In a similar manner, the arm portion 22 can be provided with any number of cutting blades while the arm portion 30 would include the same number of support rolls, or possibly less if one support roll is situated opposite a plurality of cutting blades. When multiple cutting blades are provided, an adjustment mechanism can be used to adjust the spacing between the cutting blades.

Referring now to FIGS. 4-10, a third embodiment of a cutting device in accordance with the invention is designated generally as 40 and enables an adjustment in the length of the arm portions 22, 30. To this end, each arm portion 22, 30 includes a telescoping member 42, 44, respectively, which is movable relative to a frame portion 46, 48 of the respective arm portion 22, 30. The cutting blade 24 is arranged on the telescoping member 42 while the support roll 32 is arranged on the telescoping member 44.

Figure 6:
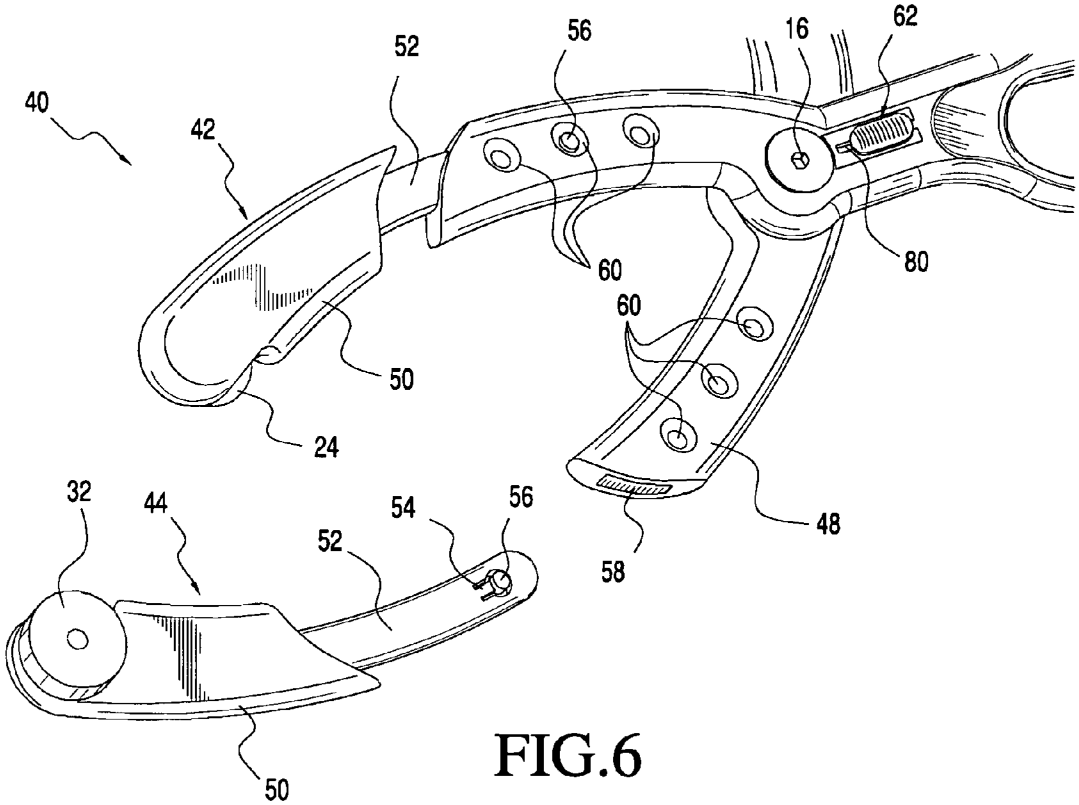
FIG. 6 is a view showing a telescoping member removed from the cutting device shown in FIG. 4.
Figure 7:
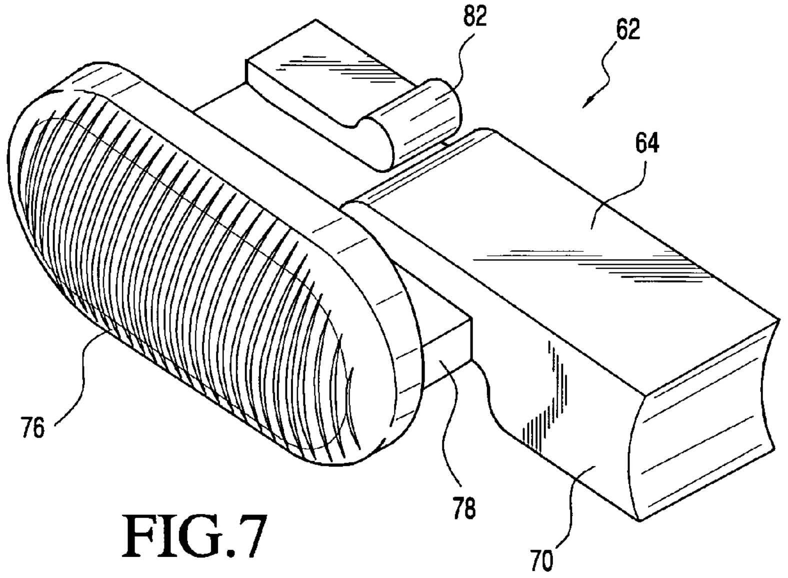
FIG. 7 is a perspective view of a locking member of the cutting device shown in FIG. 4.

Each telescoping member 42, 44 includes a main body part 50 (on which the cutting blade 24 or support roll 32 is arranged), an arcuate projection 52 extending from a rear end of the main body part 50 and a resilient spring 54 having a bump or protuberance 56 arranged on the projection 52 (see FIG. 6). The frame portions 46, 48 each include a slot 58 in which the projection 52 slides and a plurality of apertures 60 communicating with the slot 58 and, each adapted to accommodate the protuberance 56. Although three apertures 60 are shown, any number can be provided.

Adjustment of the length of the arm portions 12, 14 is achieved by depressing the protuberance 56 against the bias of the spring 54 when situated in one aperture 60 and moving the telescoping member 42, 44 relative to the respective frame portion 46, 48 until the protuberance 56 aligns with another aperture 60 (during this movement the projection 52 slides within the slot 58). Variable lengths of the arm portions 12, 14 can therefore be provided as desired for different uses of the cutting device 40.

Each telescoping member 42, 44 can also be separated from the respective frame portion 46, 48 by depressing the protuberance 56 when situated in the forwardmost aperture 60 and pulling the telescoping members 42, 44 outward. By providing a removable telescoping members, different telescoping members 42, 44 can be constructed and used alternatively. Different telescoping members 42 might include different cutting blades or multiple cutting blades while different telescoping members 44 might include multiple support rolls (see FIG. 11 described below). A set of telescoping members 42, 44 can therefore be provided for each cutting device 40.

Figure 5:
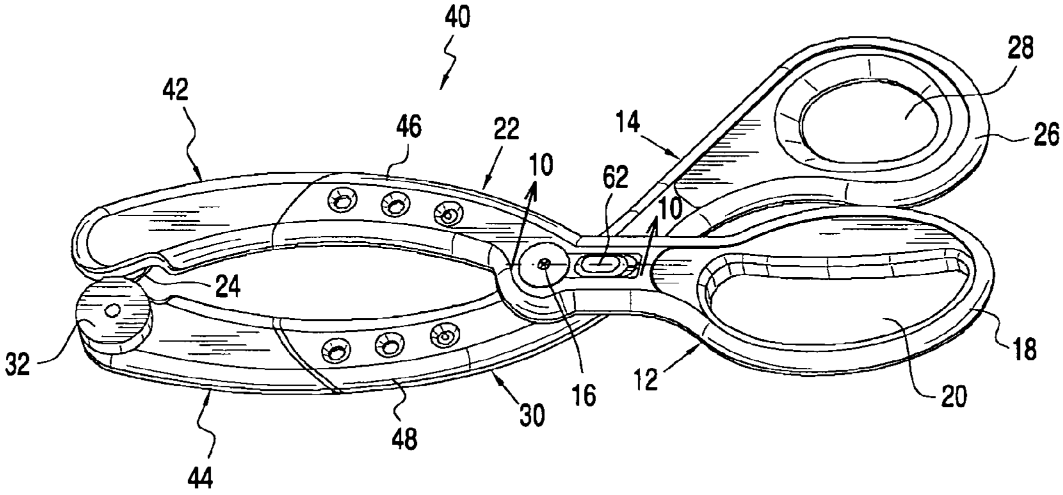
FIG. 5 is a rear elevational view of the cutting device shown in FIG. 4 in a storage position.

Cutting device 40 also includes a locking mechanism 62, which may also be incorporated into any of the other cutting devices described herein. Locking mechanism 62 is designed to enable the cutting device 40 to be locked in a safety position when the telescoping members 42, 44 are in a retracted position (as shown in FIG. 5).

Figure 8:
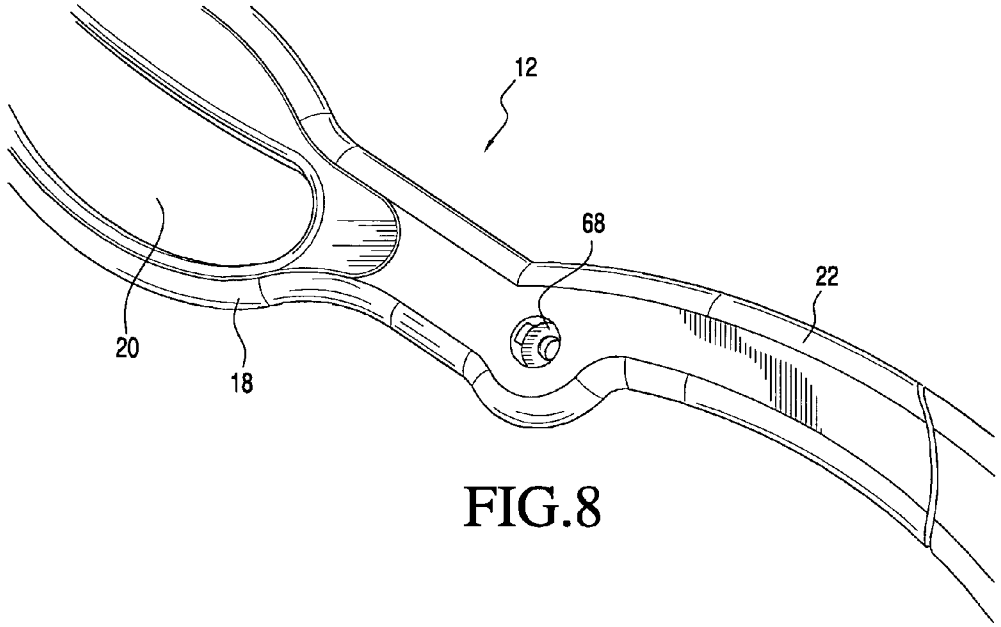
FIG. 8 is a front view of one of the pivot members of the cutting device shown in FIG. 4 with the locking member in a recessed position.
Figure 9:
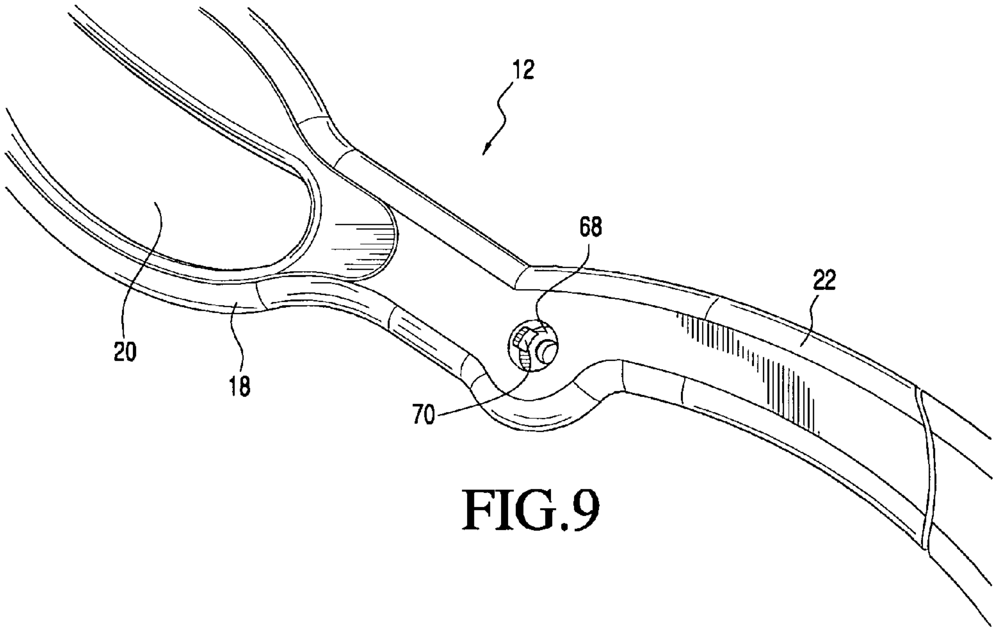
FIG. 9 is a front view of one of the pivot members of the cutting device shown in FIG. 4 with the locking member in an extended position.
Figure 10:
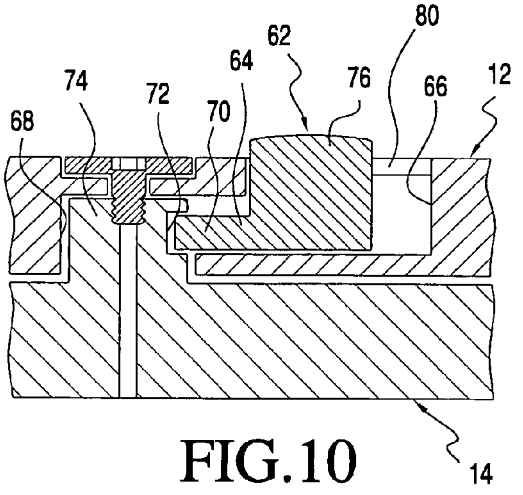
FIG. 10 is a cross-sectional view taken along the line 10-10 in FIG. 5.

Locking mechanism 62 comprises a locking member 64 slidably arranged in a cavity 66 in pivot member 12 which opens into a cylindrical recess 68, and having a projection 70 which enters in a recess 72 in a cylindrical pivot pin 74 associated with the pivot member 14 (see FIGS. 8-10). Locking member 64 also includes a contact portion 76 which enables the locking member 64 to be manually slid back and forth in the cavity 66 causing the projection 70 to enter into or retract from the recess 68 (as shown in FIGS. 8 and 9) to thereby selectively lock or unlock the cutting device 40. Contact portion 76 is spaced from the locking member 64 by an intermediate portion 78 which slides in a slot 80 formed on the pivot member 12. Locking member 64 also includes one or more resilient locking springs 82 which engage with side surface defining the cavity 66 and prevent the locking member 64 from sliding without manual actuation of the contact portion 76.

Pivot pin 74 is situated in the recess 68 when the pivot members 12, 14 are pivotally connected together. The recess 72 aligns with the projection 70 only when the telescoping members 42, 44 are in their retracted position. Otherwise, as the telescoping members 42, 44 are extended outward, the pivot member 12 pivots relative to the pivot member 14 such that the handle portions 18, 26 are moved apart from one another with the result that the pivot pin 74 pivots to a position out of alignment with the projection 70.

Figure 11:
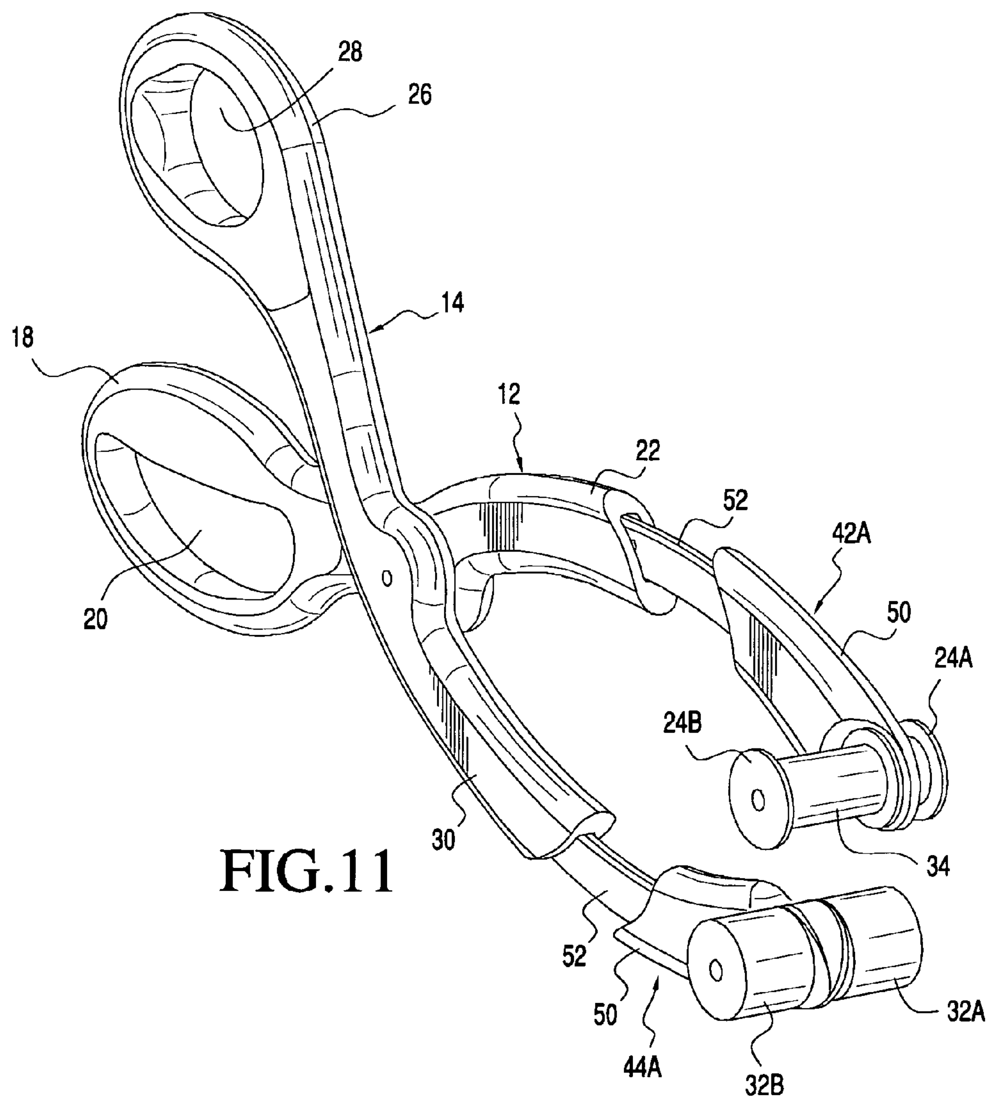
FIG. 11 is a front perspective view of a fourth embodiment of a cutting device in accordance with the invention in a position ready for use.

Referring now to FIG. 11, in this embodiment, telescoping member 42A includes two cutting blades 24A, 24B arranged at the free forward end part of the main body part 50 thereof. Cutting blades 24A, 24B can be mounted to a common cutting shaft 34. Telescoping member 44A includes two support rolls 32A, 32B arranged on the main body part 50 thereof in a position opposite a respective cutting blade 24A, 24B. Alternatively, a single support roll can be provided with an axial length sufficient to be opposite both the cutting blades 24A, 24B. With this cutting device, a pair of parallel interior cuts can be formed in sheet material.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention. Although the invention is described with particular emphasis on its ability to make interior cuts, it is nevertheless useful for making edge cuts in sheet material which extend from an edge of the sheet material.

I claim:

1. A cutting device, comprising:

first and second pivot members pivotally connected to one another at a pivot point, said first and second pivot members each including a handle portion with a finger-receiving aperture on one side of the pivot point and an arm portion on the other side of the pivot point;

at least one rotatable, substantially circular cutting blade arranged at a free end part of said arm portion of said first pivot member; and at least one support roll arranged at a free end part of said arm portion of said second pivot member in a position opposite at least one of said at least one cutting blade, said arm portions each including a frame portion connected to said handle portion and a telescoping member movable relative to said frame portion, said at least one cutting blade being arranged on said telescoping member of said first pivot member and said at least one support roll being arranged on said telescoping member of said second pivot member.

2. The cutting device of claim 1, wherein said arm portions of said first and second pivot members are arcuate and in opposite directions of curvature to thereby form a gap therebetween.

3. The cutting device of claim 1, wherein said at least one cutting blade comprises two cutting blades, one on each side of said arm portion of said first pivot member.

4. The cutting device of claim 3, wherein said at least one support roll comprises two support rolls, one on each side of said arm portion of said second pivot member and each opposite a respective one of said two cutting blades.

5. The cutting device of claim 1, wherein each of said at least one support roll is rotatable and substantially circular.

6. The cutting device of claim 1, wherein said telescoping members of said arm portions enable said arm portions to have an adjustable length.

7. The cutting device of claim 1, wherein for each of said at least one cutting blade there is only a single one of said at least one support roll opposite said cutting blade.

8. The cutting device of claim 1, wherein each of said telescoping members includes a main body part and a projection extending from a rear end of said main body part, said frame portions each including a slot receivable of said projection of a respective one of said telescoping members.

9. The cutting device of claim 8, further comprising positioning means for fixing said projection of each of said telescoping members in a plurality of different positions in said slot of a respective one of said frame portions.

10. The cutting device of claim 9, wherein said positioning means comprise a resilient spring having a protuberance arranged on each of said projections and a plurality of apertures arranged on said frame portions, each of said apertures being arranged to accommodate a respective one of said protuberances.

11. The cutting device of claim 1, wherein said telescoping members are detachable from said frame portions.

12. The cutting device of claim 1, wherein said at least one cutting blade comprises two cutting blades mounted on a common shaft, one on each side of said arm portion of said first pivot member.

13. The cutting device of claim 12, wherein said at least one support roll comprises two support rolls, one on each side of said arm portion of said second pivot member and each opposite a respective one of said two cutting blades.

14. The cutting device of claim 1, further comprising locking means for locking said first and second pivot members when said telescoping members are in a retracted position.

15. The cutting device of claim 14, wherein said locking means comprise a movable locking member arranged in a cavity in said first pivot member which opens into a cylindrical recess and having a projection movable into said recess, said second pivot member having a cylindrical pivot pin arranged in said cylindrical recess of said first pivot member and including a recess receivable of said projection of said locking member, said recess in said cylindrical pivot pin of said second pivot member aligning with said projection only when said telescoping members are in the retracted position.

16. The cutting device of claim 1, wherein said arm portions are spaced apart from one another by a gap.

17. A cutting device for making interior cuts in a sheet material, comprising:

first and second elongated members pivotally connected together at a pivot point between opposite ends of said members;

at least one freely rotatable cutting blade arranged at a free end portion of said first member on a first side of said pivot point;

at least one support roll arranged at a free end portion of said second member on a first side of said pivot point and in a position opposite at least one of said at least one cutting blade; and finger-gripping portions arranged on a second side of said pivot point on each of said first and second members, said first and second members each including a frame portion connected to said finger-gripping portion and a telescoping member movable relative to said frame portion, said at least one cutting blade being arranged on said telescoping member of said first member and said at least one support roll being arranged on said telescoping member of said second member.

18. The cutting device of claim 17, wherein said at least one cutting blade comprises two cutting blades, one on each side of said first member.

19. The cutting device of claim 17, wherein for each of said at least one cutting blade there is only a single one of said at least one support roll opposite said cutting blade.

20. The cutting device of claim 17, wherein each of said telescoping members includes a main body part and a projection extending from a rear end of said main body part, said frame portions each including a slot in which said projection of a respective one of said telescoping members moves.

21. The cutting device of claim 20, further comprising positioning means for fixing said projection of each of said telescoping members in a plurality of different positions in said slot of a respective one of said frame portions.

22. The cutting device of claim 21, wherein said positioning means comprise a resilient spring having a protuberance arranged on each of said projections and a plurality of apertures arranged on said frame portions, each of said apertures being arranged to accommodate a respective one of said protuberances.

23. The cutting device of claim 17, further comprising locking means for locking said first and second members when said telescoping members are in a retracted position.

24. The cutting device of claim 23, wherein said locking means comprise a movable locking member arranged in a cavity in said first member which opens into a cylindrical recess and having a projection movable into said recess, said second member having a cylindrical pivot pin arranged in said cylindrical recess of said first member and including a recess receivable of said projection of said locking member, said recess in said cylindrical pivot pin of said second member aligning with said projection only when said telescoping members are in the retracted position.

* * * * *